No. 785,504. PATENTED MAR. 21, 1905.
P. LE SUEUR.
VEHICLE AXLE.
APPLICATION FILED OCT. 28, 1903.
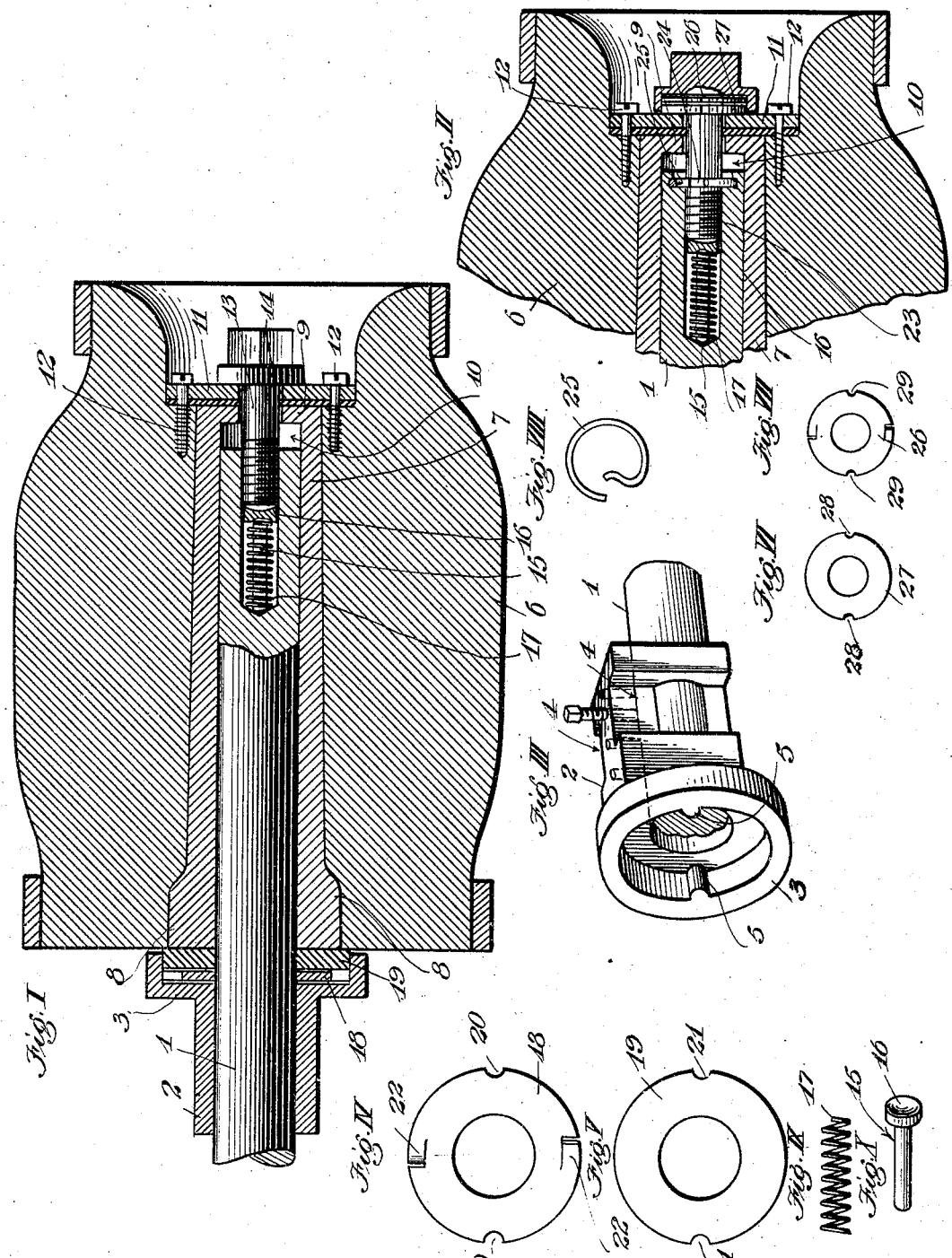
WITNESSES
INVENTOR
PHILIP LeSUEUR
by Townsend Bros.
Attys.

No. 785,504.

Patented March 21, 1905.

UNITED STATES PATENT OFFICE.

PHILIP LE SUEUR, OF CALABASAS, CALIFORNIA.

VEHICLE-AXLE.

SPECIFICATION forming part of Letters Patent No. 785,504, dated March 21, 1905.

Application filed October 28, 1903. Serial No. 178,834.

*To all whom it may concern:*

Be it known that I, PHILIP LE SUEUR, a citizen of the United States, residing at Calabasas, in the county of Los Angeles and State of California, have invented a new and useful Vehicle-Axle, of which the following is a specification.

This invention relates to a new and improved construction of a vehicle axle and hub.

One object of this invention is to provide new and useful means performing the function of, first, retaining the axle-box on the axle; second, retaining the hub on the axle, means also being provided for retaining a supply of lubricant at the end of the axle.

Another object is to provide efficient means for preventing the accidental displacement or loss of the hub-retaining device.

Another object is to provide a new and useful bolt-lock.

In vehicles having the ordinary form of axles a frequent source of trouble and annoyance and sometimes the cause of serious accidents endangering life is the tendency of the hub-retaining nut to become unscrewed and lost off by the jar of the vehicle or the reverse turning of the wheels caused by backing the vehicle, and another object of this invention is to provide means for preventing the nut from accidentally unscrewing.

Another object is to provide a novel means whereby the hub-retaining device is positively positioned with respect to the axle.

Other objects of the invention are to produce a device of the character described which is simple in construction, effective in operation, economical of manufacture, and durable in use.

Another object is to provide a novel auxiliary bolt-lock.

The accompanying drawings illustrate the invention.

Referring to the drawings, Figure I is a vertical section through the device. Fig. II is a vertical section showing a modified form of a portion of the device. Fig. III is a perspective of the adjustable shoulder. Fig. IV is a plan view of a spring-washer. Fig. V is a plan view of the bearing-washer, which coacts with the spring-washer. Fig. VI is a detail view in plan of the bearing-washer of the form shown in Fig. II. Fig. VII is a detail view in plan of the spring-washer, which coacts with the bearing-washer of the form shown in Fig. II. Fig. VIII is a detail view in plan of the retaining-spring of the form shown in Fig. II. Fig. IX is a detail view of the coil-spring, which is used in both forms shown in Figs. I and II. Fig. X is a perspective of the bolt-stop.

1 designates the axle, the outer end of which is drilled and tapped, as shown, and which is supported by an adjustable shoulder 2, which is provided with a recessed flange 3. The shoulder 2 is cut on opposite sides to form parallel vertical recesses 4, which receive straps or clips for attaching the journal to the vehicle-frame. (Not shown.) The inner periphery of the flange 3 is provided with a pair of diametrically opposite rounded lugs 5. The shoulder 2 is provided with a series of threaded holes for receiving a set-screw for clamping the shoulder on the axle, as shown in detail in Fig. III.

6 designates the hub, which is mounted on an axle-box 7, the latter being preferably tapering, as shown, to secure a snug fit within the hub 6 and having oppositely-disposed radial projections 8, which are received into the hub 6 and which prevent the axle-box from turning in the hub. The outer end of the axle-box 7 is provided with an inturned flange 9, thereby forming a semiblind axle-box, and the end of the axle 1 terminates short of the flange 9, as shown, thus forming a chamber 10, adapted for the reception of lubricants. The outer end of the hub is provided with a bearing-plate 11, which is secured to the hub by means of bolts 12.

The hub-retaining device comprises a solid bolt 13, the shank having an elongated smooth wearing-surface, but threaded at its end and provided with a flanged head 14, the face of the flange of which bears against the outer face of the bearing-plate, the threaded end of the bolt 13 engaging with the tappet portion of the outer end of the axle 1. The end of the bolt 13 is convex, as shown, and interposed between the end of the bolt 13 and the bottom of the hole in the end of the axle 1 is a bolt-stop 15, having a head 16, the outer face of which is concave for the reception of the convex end of the bolt 13. A coil-spring 17 encircles the shank of the bolt-stop 15 and is interposed between the head 16 and the bottom of the hole in the end of the axle 1. The coil-spring being longer than the shank of the bolt-stop serves to press the bolt-stop outwardly, so that its concave head 16 is always tightly forced against the convex end of the bolt 13, thus frictionally binding the male threads of the bolt 13 against the female threads of the axle 1 and preventing the bolt 13 from turning relatively to the axle.

In order to form a resilient face between the adjustable shoulder and the inner end of the axle-box, in order to prevent the too free escape of oil at that point, a washer may be interposed between the shoulder and axle-box and springs placed between the washer and shoulder to press the washer at all times firmly against the inner end of the axle-box and shut off undue loss of oil, and for this purpose I employ the following preferred construction: Washers 18 and 19 are both housed within the recessed flange 3, and each are provided with concave notches 20 and 21, which receive the convex lugs 5, and the washers 19 and 20 are thereby held from turning in the head of the axle-journal 2, thereby preventing the washers from cutting the axle. The washer 18 is provided with spring-wings 22, preferably formed integral with the body of the washer, and serves to force the bearing-washer 19 tightly against the inner end of the axle-box 7, thereby at all times tending to push the hub toward the outer end of the axle and maintaining the bearing-plate 11 in close contact with the face of the bolt-head 14, thus preventing the escape of oil at either end of the axle. This construction is of especial value in preventing the loss of lubricant when the axle-box gets worn, for then when the wheel chucks it literally squeezes out the lubricant in the ordinary open-end axle-box that is between the bearing of axle and axle-box, where it is wasted. The action of the spring-acted washer is this: Having only a resilient motion, being non-turnable, the washer does not cut the axle nor does the hole in the washer wear, but, on the contrary, dust particles adhere to the washer, which fill up interstices where lubricant might escape, as the washer moves always on the same plane, and when the wheel chucks, the washer being by the action of the spring always pressed tightly against the end of the worn axle-box, the hole in the washer not being worn retains the lubricant where it is needed most and where in practice all wagon-axles run dry.

The bolt-stop 15 is of the requisite length, so that when the bolt is screwed in until stopped by the bolt-stop 15 the hub will be held on the axle so that its inner face comes a slight distance from the edge of the flange 3, the resilient device within the recessed flange 3 holding the hub away from the edge of the flange 3 and bringing the wear between the hub and bearing-washer 19.

The object in making the head of the bolt 13 convex and the head of the bolt-stop 15 concave is to allow the head of the bolt-stop to centrally seat itself against the end of the bolt 13, so that there is no possibility of the bolt-stop becoming canted and bent and diminishing the distance which the bolt 13 may be screwed in before being stopped by the bolt-stop.

It is obvious that in placing the wheel on the axle and screwing in the bolt 13 no special care need be exercised in screwing in the bolt 13 to secure the requisite positioning of the hub, as the length of the bolt-stop 15 is formed exactly as desired, and the bolt 13 may be freely turned in by the wrench until it is impossible to screw it further by reason of the interposition of the bolt-stop 15.

If by reason of wear, for instance, between the flange of the bolt-head 14 and the outer face of the bearing-plate 11 the hub has acquired a degree of objectionable end thrust, the bearing-washer between the hub and the adjustable shoulder may be replaced by a thicker one, which will prevent undue chucking and yet maintain the proper track.

Fig. II shows another manner of construction, in which the hub-retaining bolt (designated in this figure 23) is formed somewhat different from the bolt 13, (shown in Fig. I,) the bolt 23 being provided with an annular groove 24, which is engaged by an auxiliary bolt-lock 25. (Shown in detail in Fig. VIII.) The auxiliary bolt-lock comprises a circular spring which lies in a recess in the end of the axle, the latter being slightly undercut, as shown, to hold the auxiliary bolt-lock in place. Said recess is designed also to enlarge the oil-chamber without decreasing the bearing-surface between the axle and axle-box. This auxiliary bolt-lock furnishes an additional means for preventing accidental unscrewing of the bolt 23. Of course when the bolt is unscrewed by means of a wrench sufficient power is applied to overcome this friction and the bolt is readily unscrewed, the spring-retainer 25 yielding sufficiently to escape the groove 24 and permit the bolt to be withdrawn or as readily replaced. The head of the bolt 23 has an annular recess, which receives a spring-washer 26 and a bearing-washer 27, the respective washers 26 and 27 being formed similar to the washers 18 and 19, previously described, each washer 26 and 27 having concave notches 28 and 29, respectively, which receive lugs similar to the lugs 5, carried by the flange of the bolt-head. The spring-washer 26 forces the bearing-washer 27 against the outside face of the plate 11, and thereby thrusts the hub 6 and axle-box 7 resiliently toward the inner end of the axle 1. These resilient devices may be employed in either one or both ends of the axle.

While I have shown and described the preferred embodiment of my invention, it should be understood that various changes and modifications may be made therein without departing from the scope of the claims.

What I claim is—

1. In combination, an axle, a semiblind axle-box thereon, a hub on the box provided with a bearing-plate at its outer end, a retaining-bolt through said plate and into the end of the axle, yielding means at the inner end of the hub for normally forcing said hub outward, and means for holding the bolt against unscrewing from the axle.

2. In combination, an axle having an interiorly-screw-threaded axial recess in its outer end, a semiblind axle-box thereon, a hub on the box provided with a perforated plate at its outer end, a retaining-bolt through said plate and into the end of the axle, a stop adjustably secured to the axle, and yielding means between the stop and the inner end of the hub for forcing the hub outward and holding the plate against the head of the bolt.

3. In combination, an axle having an interiorly-screw-threaded axial recess in its outer end, the outer end of said recess being enlarged, a semiblind axle-box thereon, a hub on the box provided with a perforated plate at its outer end, a retaining-bolt through the plate and into the end of the axle, a retainer in the enlargement of the recess and in engagement with the bolt, and a stop on the axle at the inner end of the hub for holding the hub in position.

4. In combination, an axle having an interiorly-screw-threaded axial recess in its outer end, the outer end of the recess being enlarged and undercut, a semiblind axle-box on the axle, a hub on the box provided with a perforated plate at its outer end, a retaining-bolt through the plate and into the end of the axle, the intermediate portion of the bolt being circumferentially grooved, a spring in the undercut portion of the recess, one end of which fits in the groove of the bolt, and a stop on the axle at the inner end of the hub for holding the hub in position.

5. In combination, an axle having an axial recess in its outer end, the outer end of the recess being enlarged and undercut, a semiblind axle-box on the axle, a hub on the box provided with a perforated plate at its outer end, a bolt through the plate and into the recess of the axle, the head of the bolt being recessed and the intermediate portion grooved circumferentially, a bearing-washer and a spring-washer in the bolt-head, a spring in the undercut portion of the recess and in engagement with the grooved portion of the bolt, a spring in the recess beyond the end of the bolt, a bolt-stop between the spring and the bolt, and a stop on the axle at the inner end of the hub.

6. In combination, an axle, a stop thereon having recessed sides and a flange at one end provided with inwardly-projecting lugs, a set-screw in the stop, a hub on the axle, means for retaining the hub in position and two peripherally-notched washers in the flange of the stop, one of which is provided with springs for forcing the other washer against the end of the hub.

7. In combination, an axle having an interiorly-screw-threaded axial recess in its outer end, a semiblind axle-box on the axle, the outer end of which is normally at a distance from the end of the axle, a hub on the box having a perforated plate at its outer end, a bolt through the plate and into the end of the axle, the head of which is recessed adjacent to the plate, two washers in said recess, one of which is provided with springs to force the other one against the plate, a stop adjustably secured to the axle at the inner end of the hub and provided with a flanged end, two washers in said flanged portion, one of which is provided with springs for holding the other washer against the end of the hub and normally forcing the hub outward.

8. In combination, an axle, a semiblind axle-box thereon inclosing the end of the axle and forming an oil-chamber, a hub carried by the axle-box, a bearing-plate on said hub, the outer end of said axle being drilled and threaded, a solid retaining-bolt passing through said bearing-plate on the hub and engaging with the threads in the axle, said retaining-bolt having a circumferential groove, the end of said axle being recessed to enlarge the oil-chamber, and a circular spring in the recess engaging said groove in the bolt.

9. In combination, an axle, a semiblind axle-box thereon inclosing the end of the axle and forming an oil-chamber, a hub carried by the axle-box, a bearing-plate on said hub, the outer end of said axle being drilled and threaded, a solid retaining-bolt passing through said bearing-plate on the hub and engaging with the threads of the axle, a bolt-stop between the bolt and the bottom of the hole in the axle, said retaining-bolt having a flange on the head thereof, said flange having a recess and a pair of washers within said recess, one of said washers having spring-arms which force the other washer against the bearing-plate on the hub.

10. In combination, an axle, an axle-box thereon, a hub carried by the axle-box, a bearing-plate on said hub, the outer end of said axle being drilled and threaded, a solid retaining-bolt passing through said bearing-plate on the hub and engaging with the threads of the axle, a bolt-stop between the bolt and the bottom of the hole in the axle, said retaining-bolt having a flange on the head thereof, said flange having a recess, a pair of washers within said recess, one of said washers having spring-arms which force the other washer against the bearing-plate on the hub, both of said washers having concave notches in their periphery, said flange being provided with lugs which engage in said notches.

11. In combination, an axle, a semiblind axle-box thereon forming an oil-chamber at the end of the axle, a shoulder on the axle, a washer bearing against the inner end of the axle-box, resilient means between the shoulder and washer for pressing the washer against the axle-box, a retaining-bolt passing through the outer end of the semiblind axle-box, traversing the oil-chamber, the head of the bolt being hollow, a washer bearing against the outer end of the axle-box, and means within the head for resiliently holding said washer against the axle-box.

12. In combination, an axle, a semiblind axle-box thereon forming a chamber for the reception of lubricants, a retaining-bolt passing through the hole in the end of the semiblind axle-box closing said hole, traversing the chamber for the reception of lubricants and engaging the end of the axle, the head of the retaining-bolt being hollow, and resilient means within said head for bearing against the end of the semiblind axle-box to prevent the escape of oil from the axle-box.

13. In combination, an axle, a semiblind axle-box thereon forming a lubricant-chamber at the end of the axle, a retaining-bolt passing through the end of the semiblind axle-box, traversing the lubricant-chamber, and engaging the end of the axle, a washer bearing against the end of the axle-box, and means within the head for resiliently holding said washer against the axle-box.

14. In combination, an axle, a semiblind axle-box thereon forming an oil-chamber at the end of the axle, a solid retaining-bolt having a smooth shank passing through the hole in the end of the axle-box thereby closing said hole, and screwed into the end of the axle, a hub on the axle, a washer fastened to the hub and bearing against the outer end of the axle-box and closely fitting the smooth shank of the retaining-bolt, a bearing-plate between the washer and head of the retaining-bolt, said head being hollow, and means within the hollow head for resiliently pressing against the bearing-plate to further prevent escape of oil and ingress of dirt.

In testimony whereof I have hereunto signed my name, in the presence of two subscribing witnesses, at Los Angeles, in the county of Los Angeles and State of California, this 21st day of October, 1903.

PHILIP LE SUEUR.

Witnesses:
GEORGE T. HACKLEY,
JULIA TOWNSEND.